Nov. 19, 1935.  F. TAYLOR  2,021,874
DRAINING LIFTER
Filed Dec. 18, 1934  3 Sheets-Sheet 1

Inventor
Frank Taylor
By Clarence A. O'Brien
Attorney

Nov. 19, 1935.  F. TAYLOR  2,021,874
DRAINING LIFTER
Filed Dec. 18, 1934   3 Sheets-Sheet 2

Inventor
Frank Taylor
By Clarence A. O'Brien
Attorney

Nov. 19, 1935.   F. TAYLOR   2,021,874
DRAINING LIFTER
Filed Dec. 18, 1934   3 Sheets-Sheet 3

Inventor
Frank Taylor
By Clarence A. O'Brien
Attorney

UNITED STATES PATENT OFFICE 2,021,874

DRAINING LIFTER

Frank Taylor, Sedalia, Mo.

Application December 18, 1934, Serial No. 758,079

2 Claims. (Cl. 294—29)

This invention relates to a lifter, the general object of the invention being to provide means whereby a hot pan and the like can be lifted from a support or from an oven without danger of burning the hands or using rags and the like.

This invention also consists in certain other features of construction and in the combination and arrangement of several parts, to be hereinafter fully described, illustrated in the accompanying drawings and specifically pointed out in the appended claims.

In describing the invention in detail, reference will be had to the accompanying drawings wherein like characters denote like or corresponding parts throughout the several views, and in which.

Figure 1:
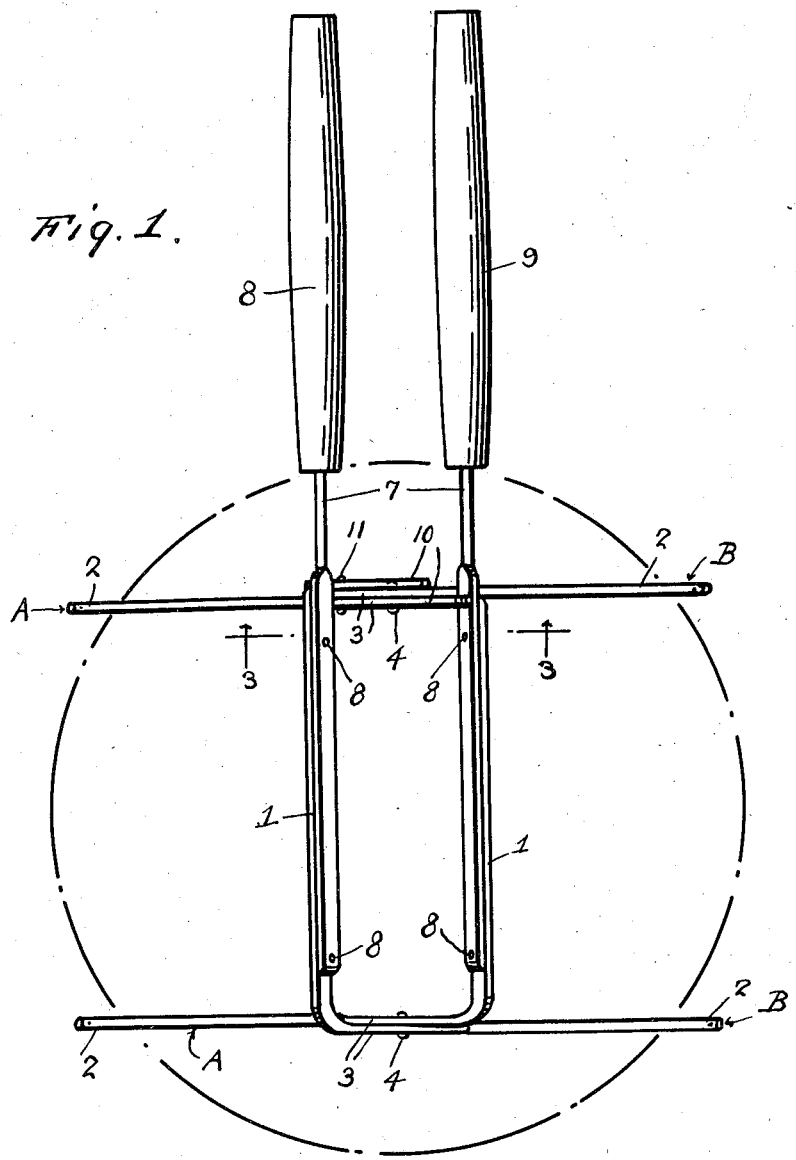
Fig. 1 is a top plan view showing the device as gripping a utensil, the utensil being shown in dotted lines.
Figure 4:
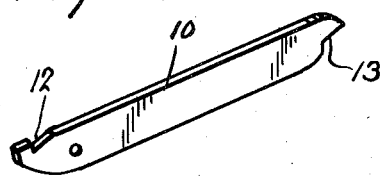
Fig. 4 is a view of one of the latch members.
Figure 2:
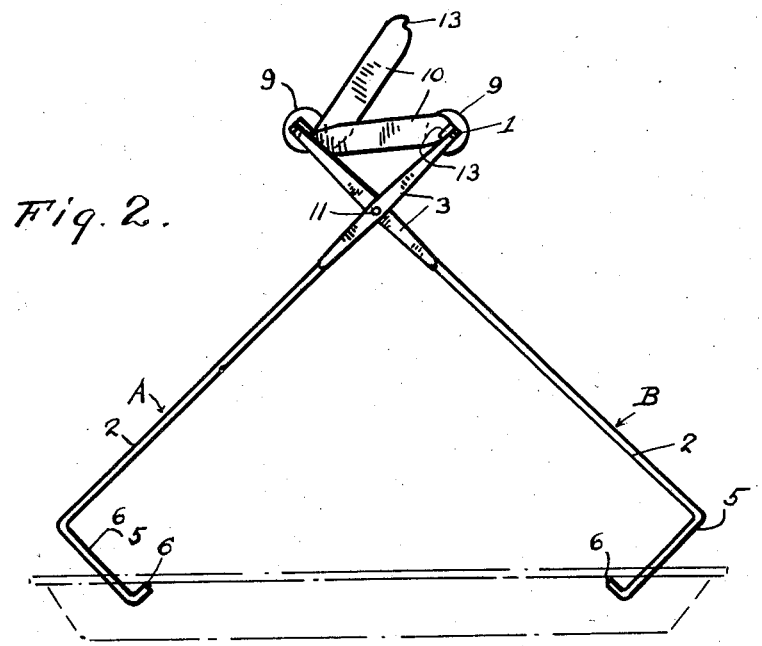
Fig. 2 is an end view showing the device in use for handling a pan.
Figure 3:
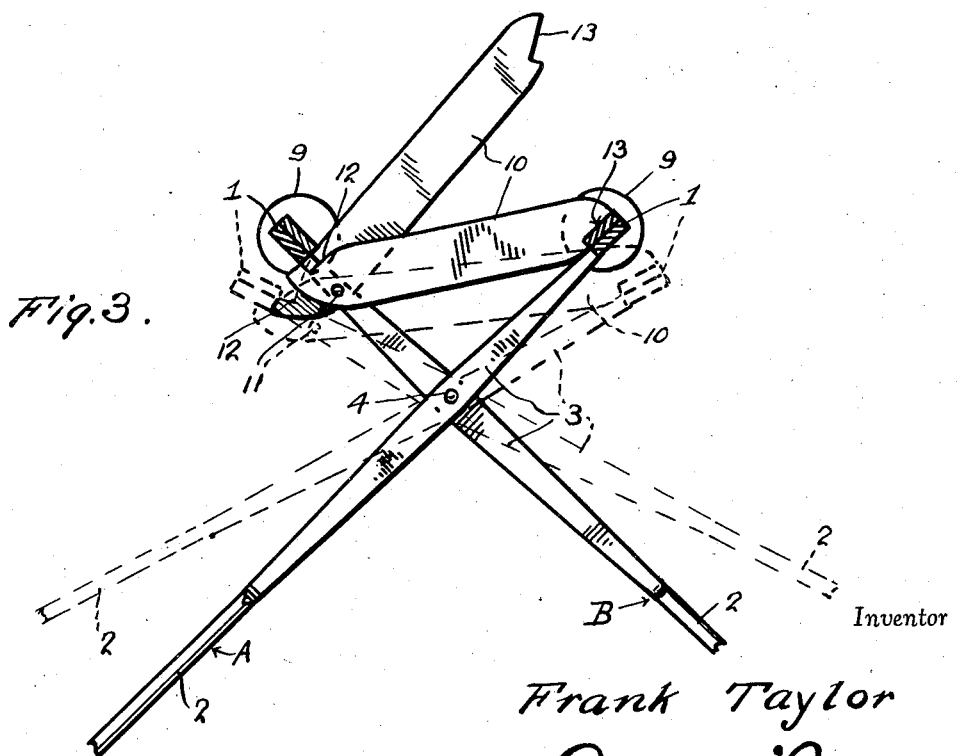
Fig. 3 is a section on line 3—3 of Fig. 1.
Figure 5:
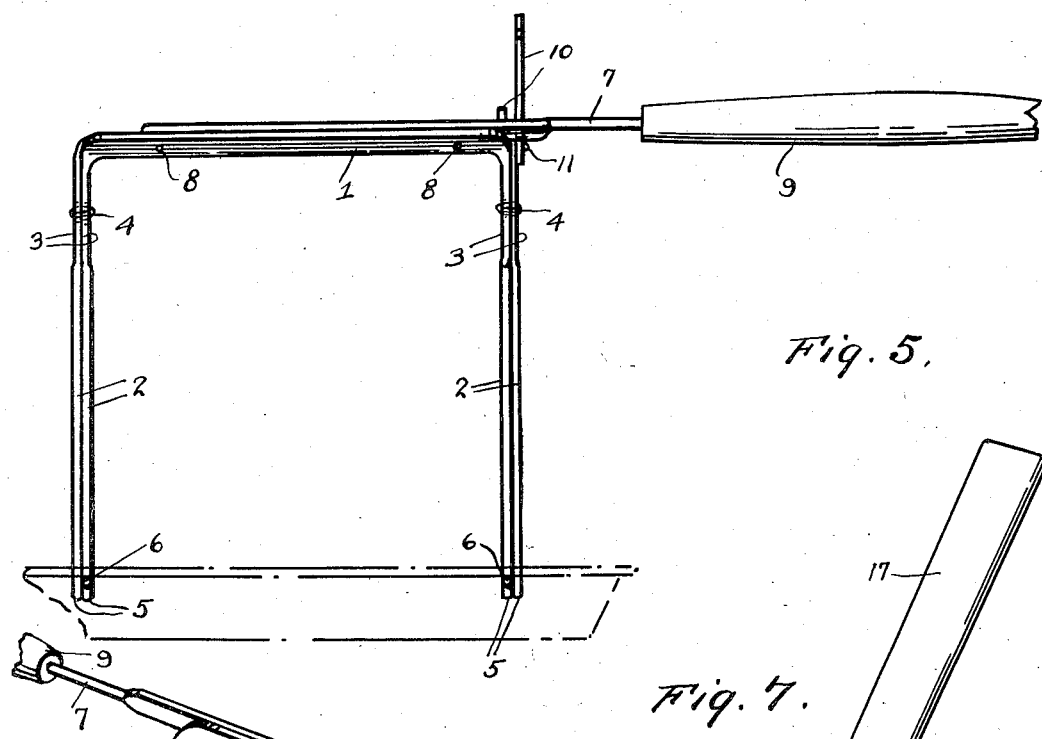
Fig. 5 is an elevation of Fig. 2.
Figure 6:
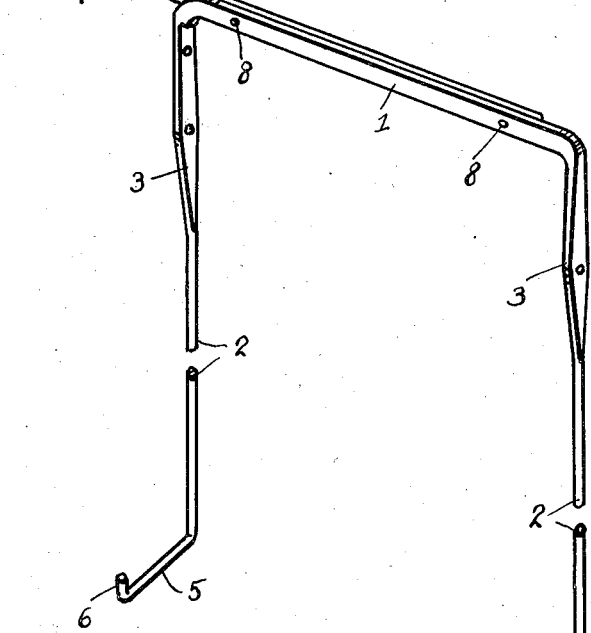
Fig. 6 is a perspective view of one of the jaw members and a handle member.

In these drawings, the letters A and B indicate a pair of substantially inverted U-shaped members each including a bight 1 and a pair of legs 2, the upper ends of the legs being widened and flat as shown at 3, and these flat portions of one member are pivotally connected to the flat portions of the other member as shown at 4. The extremity of each leg is bent inwardly at right angles as shown at 5 and the extremity of each part 5 is bent upwardly as shown at 6. The flat part of a shank 7 is riveted or otherwise fastened to the bight 1 of each member as shown at 8, the rest of the shank being rounded and fitting in a hole in a handle 9 of wood or the like. A pair of latch members 10, one of less length than the other, is pivotally connected to that leg of one member which is closest to the handle, as shown at 11, the pivots being arranged off-center in each latch member and adjacent one end thereof, said one end of each latch member being notched as shown at 12 in Fig. 4 and the opposite end of each latch member being recessed as shown at 13. The pivot pin should hold the latch members with sufficient friction so that the latch members will remain in the position to which they have been moved so that either latch member can be moved to inoperative position as shown in Figs. 2 and 3, while the other latch member is placed in engagement with the bight of the member A as shown in Figs. 2 and 3.

Thus, by using the short latch member, the jaw members will be held in a position to engage a relatively small pan or other article and by using the larger latch member, the jaw members will be held in position to engage a larger pan or other object. When in operative position, a latch member will have its recess 13 engage the bight of the jaw A with the recess 12 engaging a part of the other jaw member.

As will be seen, the hook portions at the free ends of the limbs formed by the parts 5 and 6 will engage the flange or rim of a pan or other article so that the article will be firmly held by pressing the handles towards each other and thus the article can be lifted and removed and replaced in an oven without burning the hands, the latch members acting to prevent the jaw members from closing too much when in use.

Figure 7:
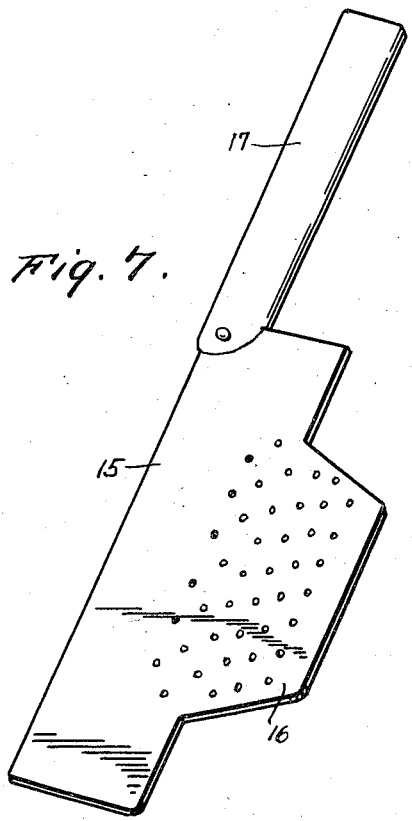
Fig. 7 is a view of a device used for draining a pan or the like when being handled by the device.

Figure 7 shows a perforated blade 15 having an extended part 16, the blade being attached to a handle 17 and this device shown in Fig. 7 can be used for draining water from a pan or like when being held by the jaw members by tilting the pan so that the water will pass through the perforations in the blade and said blade will prevent articles in the pan from dropping therefrom.

It is thought from the foregoing description that the advantages and novel features of the invention will be readily apparent.

It is to be understood that changes may be made in the construction and in the combination and arrangement of the several parts, provided that such changes fall within the scope of the appended claims.

I claim:

1. A lifting device of the class described comprising a pair of substantially inverted U-shaped jaw members having their free ends of substantially hook-shape, pivots connecting the legs of one jaw member with the legs of the other jaw member adjacent the upper ends of the legs, a shank connected to the bight of each jaw member, a handle connected to each shank, said handle and shank extending outwardly beyond one leg of each jaw member, and a pair of latch members pivotally connected to the upper end of one limb of one jaw member and having their free ends adapted to engage a part of the other jaw member.

2. A lifting device of the class described, comprising a pair of jaw members each including a pair of spaced vertically arranged elongated legs, a horizontal member connecting the upper ends of the pair of legs together, the lower ends being disconnected and each leg having its lower end bent inwardly at right angles and the extremity of each bent part bent upwardly, a shank connected to each horizontal connecting member and extending beyond one end thereof, a handle connected to the outer end of the shank, and pivots connecting one pair of legs to the other pair a slight distance from the upper ends of the legs.

FRANK TAYLOR.